United States Patent [19]

Kampman et al.

[11] 4,167,843
[45] Sep. 18, 1979

[54] BALE ROLLING APPARATUS

[75] Inventors: Lester R. Kampman; James K. Ulrich, both of Vinton, Iowa; Kazuteru Nishibe, Sapporo, Japan

[73] Assignee: Chromalloy American Corporation, New York, N.Y.

[21] Appl. No.: 826,690

[22] Filed: Aug. 22, 1977

[51] Int. Cl.² .......................................... A01D 75/00
[52] U.S. Cl. ...................................... 56/16.4; 56/341
[58] Field of Search ................................ 56/341–343, 56/1, DIG. 2, 327, 330, 16.4

[56] References Cited

U.S. PATENT DOCUMENTS

| 2,780,905 | 2/1957 | Darlington | 56/330 |
| 3,226,921 | 1/1966 | Shepley | 56/364 |
| 3,650,100 | 3/1972 | Swan, Jr. | 56/341 |
| 3,740,935 | 6/1973 | Gay | 56/16.4 |
| 3,763,636 | 10/1973 | Bliss | 56/16.4 |
| 3,792,574 | 2/1974 | Best | 56/341 |
| 3,969,879 | 7/1976 | Seymour | 56/341 |
| 3,979,892 | 9/1976 | Kucera | 56/341 |
| 4,019,309 | 4/1977 | Lundell | 56/341 |
| 4,027,465 | 6/1977 | Lundell | 56/341 |
| 4,103,475 | 8/1978 | Kampman et al. | 56/16.4 |

*Primary Examiner*—Russell R. Kinsey
*Attorney, Agent, or Firm*—Wegner, Stellman, McCord, Wiles & Wood

[57] ABSTRACT

Apparatus for rolling a swath of fodder into a bale in contact with the ground includes a frame, a driven pickup shaft with several transversely spaced sets of fodder pickup tines the tips of which sweep the ground to roll fodder in the swath forwardly to form a spiral bale, bale compacting means in the form of endless bands with raddles therebetween which has a lower working run the rear of which is immediately above the tine tips and the front of which is near the front of the frame, a pair of disks which are journalled on the sides of the frame on a common axis and which support the ends of the raddles so the working run arches upwardly between the rear and the front, spring means tensioning the bands so that when a forming bale is larger than the disks the raddles heavily compress the fodder in the periphery of the bale, and a transverse, driven beater roll immediately forward of the disks which tend to beat fodder loosened by the raddles back into the forming bale.

16 Claims, 9 Drawing Figures

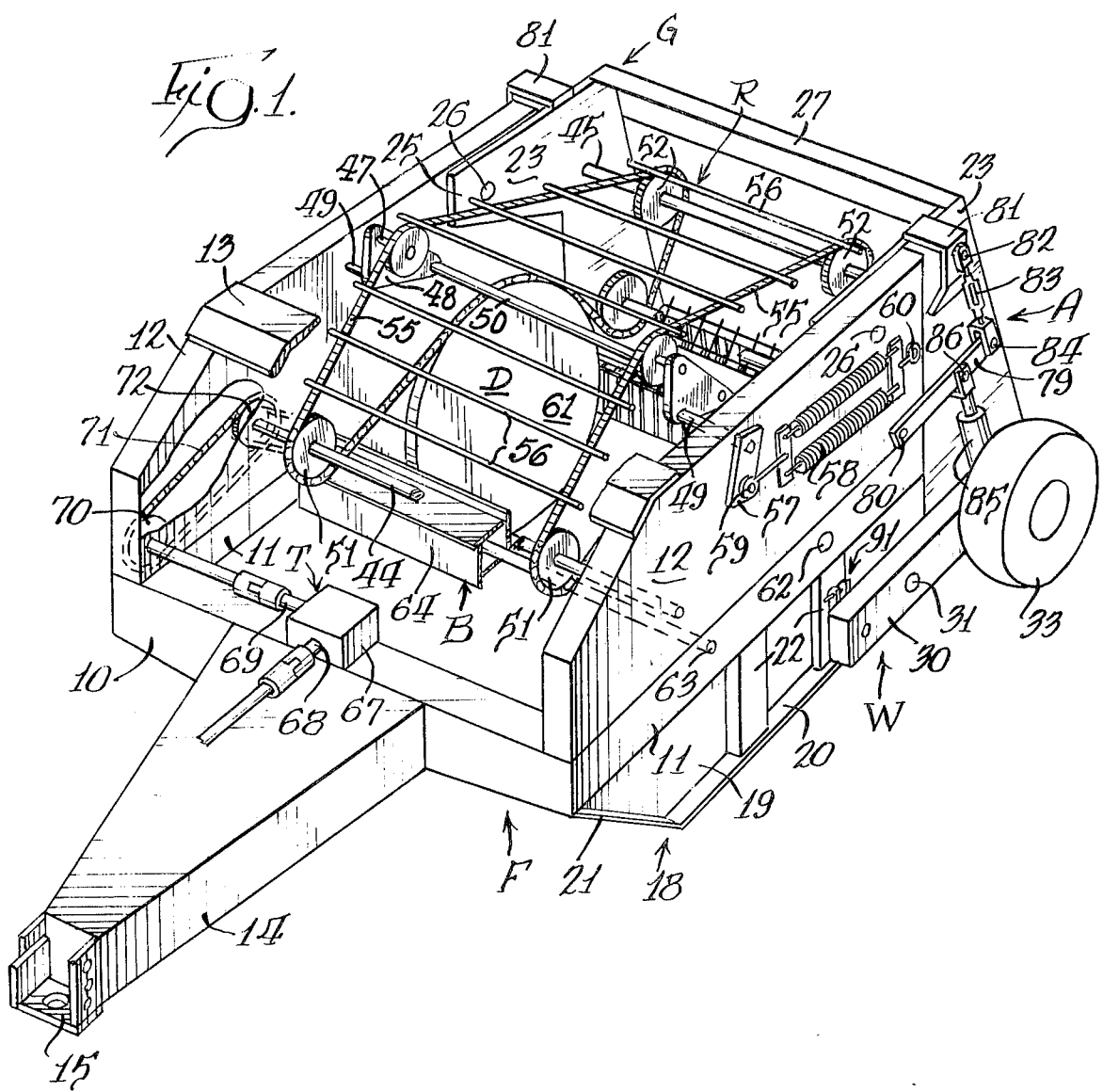

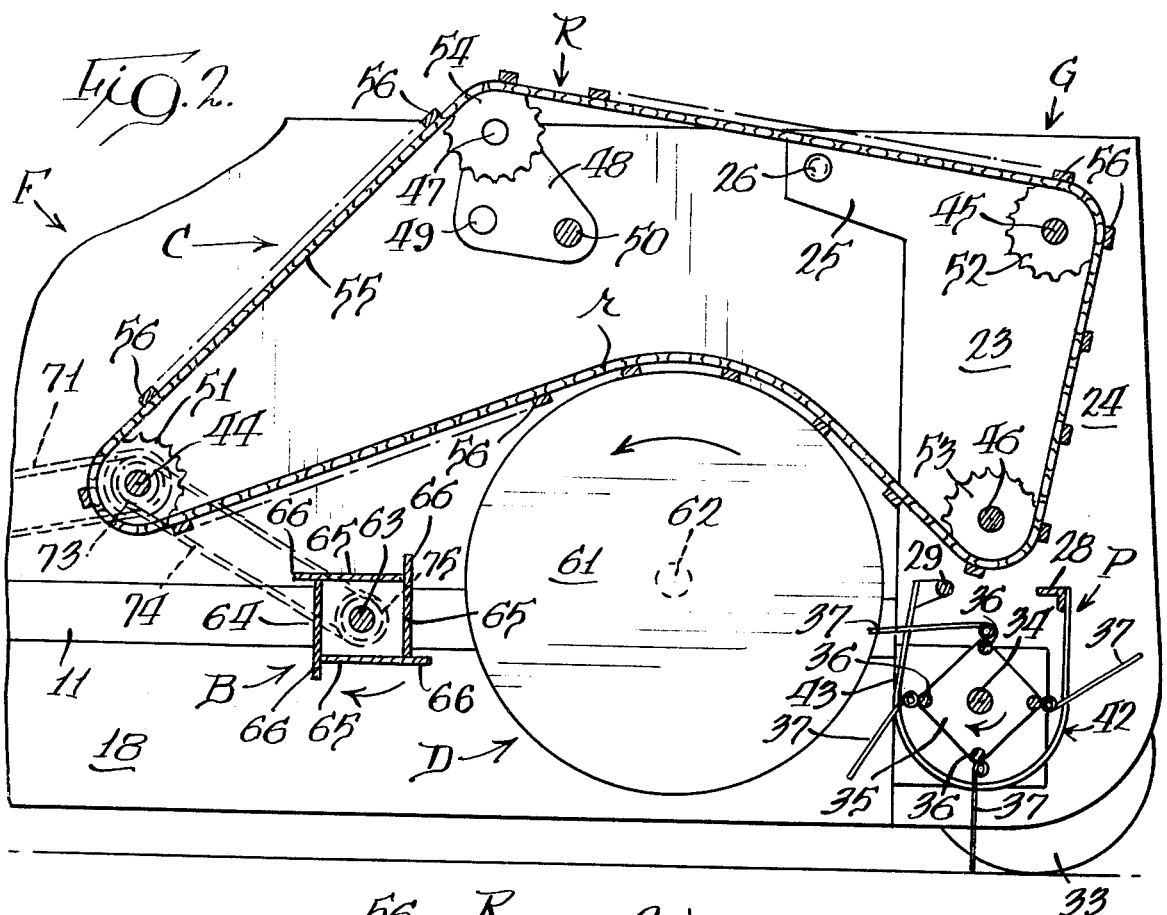
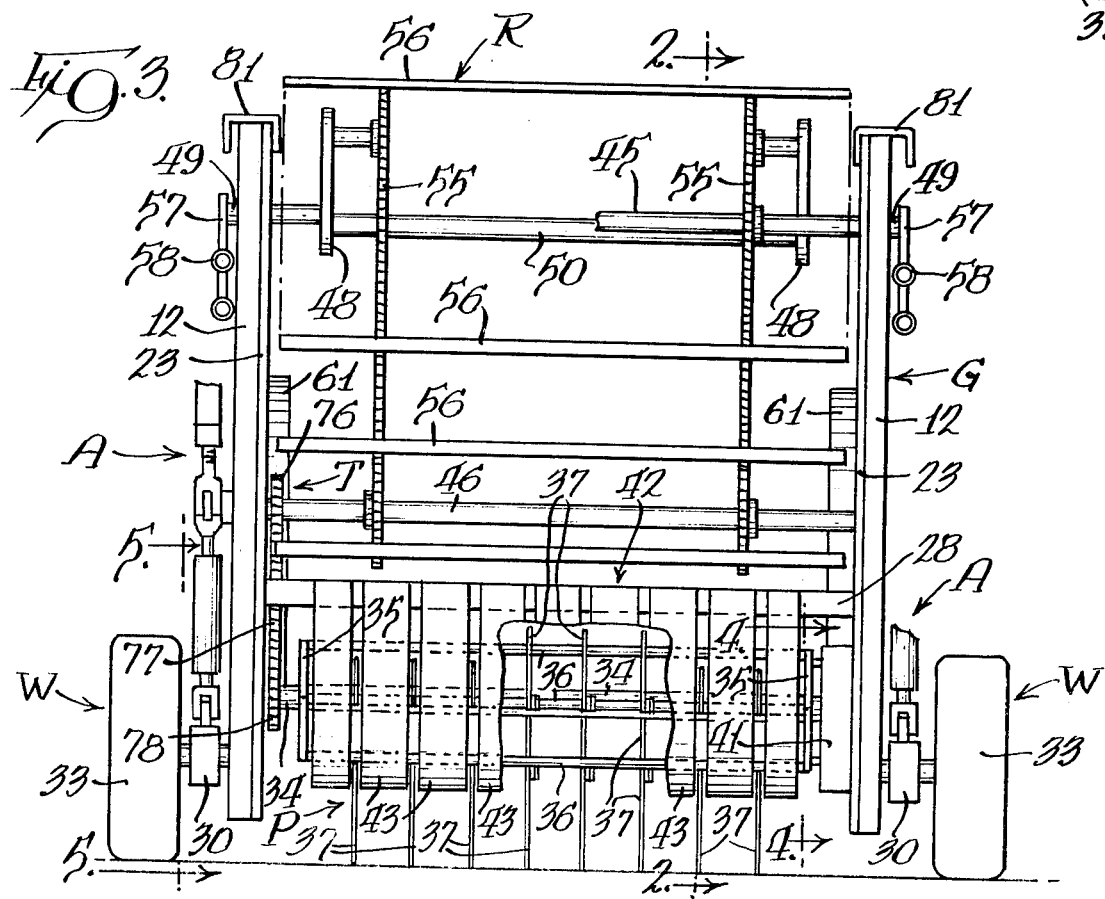

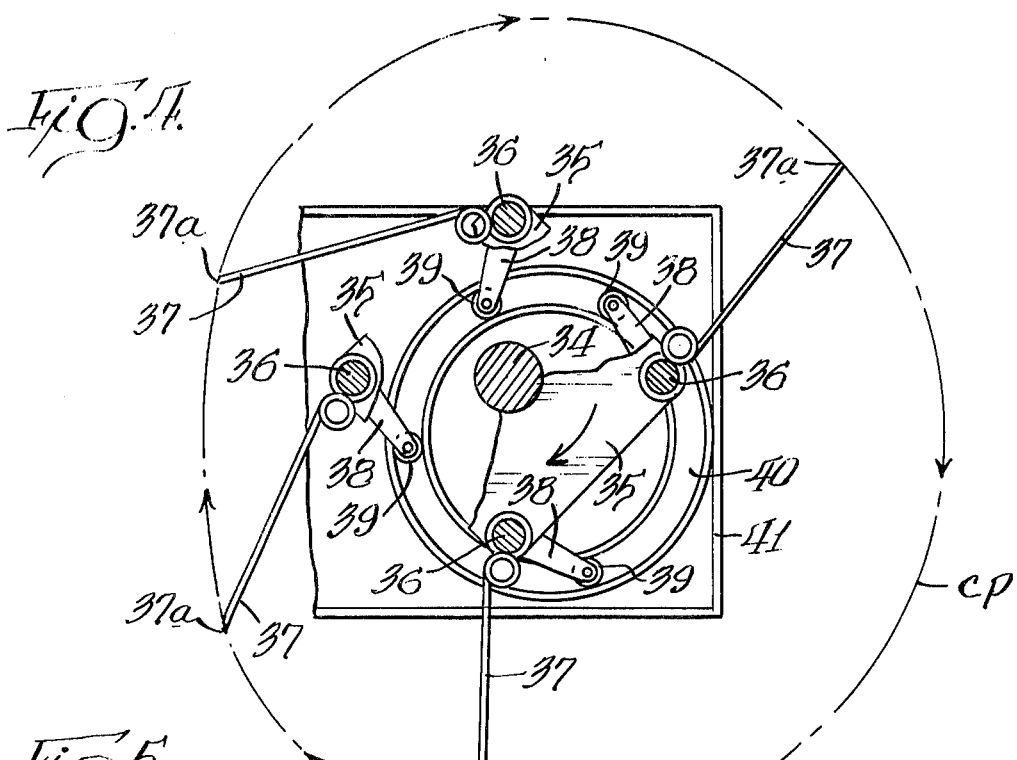
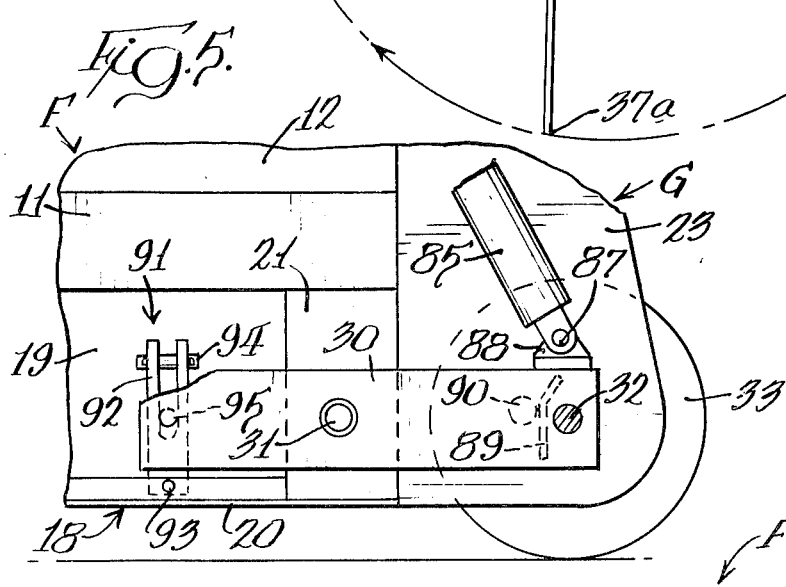
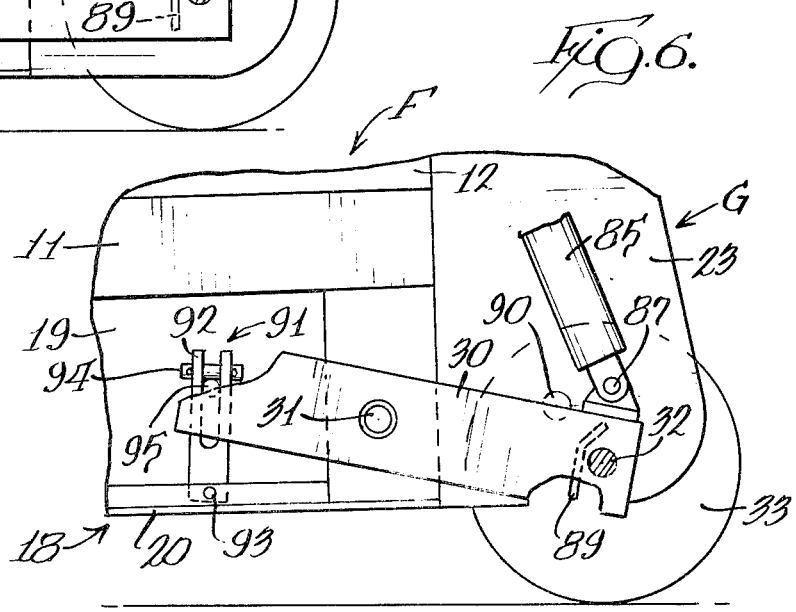

BALE ROLLING APPARATUS

CROSS-REFERENCE TO RELATED APPLICATION

A part of the subject matter disclosed in the present application is disclosed and claimed in the co-pending application of Lester R. Kampman, James K. Ulrich and James H. Hodgson, Ser. No. 719,064, filed Aug. 30, 1976 for Apparatus For Forming A Bale of Hay, issued on Aug. 1, 1978, as U.S. Pat. No. 4,103,475, owned by applicants' assignee.

BACKGROUND OF THE INVENTION

The art of rolling bales of fodder, such as hay or straw, by rolling up a swath or windrow on the ground like a carpet has only been known since 1963, when U.S. Pat. No. 3,110,145 issued to Philip John Avery, who had obtained related patents on the subject in Australia and the United Kingdom in the same year. Commercial interest in such balers in the United States dates only from about 1970. Since that time there have been a number of machines developed for rolling a swath of fodder into a bale on the ground, some of which have been improvements upon the original Avery concept, while others have employed mechanically distinct approaches. There has been a trend toward making extremely large bales which may be six feet in diameter and contain a ton or more of hay; and such mammoth bales have been made either by ground engaging balers or by chamber type balers.

Various workers in the agricultural equipment industry have sought to improve upon the quality of the bale produced by a rotary baler, and in particular a rotary baler of the type which rolls the bale on the ground. One of the most complex problems has been that of achieving the most complete possible pickup of fodder in the swath for incorporation into the bale; and another difficult problem has been that of achieving a desired bale density. Prior art patents which are particularly directed toward solving these problems are Beebout U.S. Pat. Nos. 3,680,296, issued Aug. 1, 1972; Kopaska 3,797,215, issued March 19, 1974; and Lundell 4,019,309, issued Apr. 26, 1977.

In addition, the related co-pending application of Kampman, Ulrich and Hodgson, Ser. No. 719,064 filed Aug. 30, 1976 which is now U.S. Pat. No. 4,103,475 is directed primarily to the problem of producing a bale which is somewhat loose in the middle and has a small amount of a relatively high density material around the outside.

SUMMARY OF THE INVENTION

The principal object of the present invention is to provide a ground engaging baler which combines optimum pickup of fodder in a swath with the production of a bale having a relatively loose core and a thin layer of tightly packed fodder around the perimeter of the bale.

The foregoing object is achieved by providing a driven pickup shaft with several transversely spaced sets of fodder pickup tines the tips of which sweep the ground to roll fodder in a swath forwardly with substantially complete fodder pickup; and by combining with the pickup tines a bale compacting means in the form of endless bands with raddles therebetween, the ends of the raddles being carried upon a pair of disks which are journalled on the sides of the frame on a common axis so that a lower, working run of the bale compacting means arches upwardly between the rear and the front of the baler. The rear of the working run is immediately above the tine tips as the latter swings through the top of their path of travel. Spring means tension the bands so that when a forming bale is larger than the disks the raddles heavily compress the fodder in the periphery of the bale.

Also contributing to the desired bale formation is a driven beater means immediately forward of the disks below the working run of the bale compacting means which tends to beat fodder loosened by the raddles back into the forming bale.

Another object of the invention is to provide a ground engaging baler which reverses the trend toward enormous rolled bales so as to produce a bale which does not require a separate, unique piece of bale handling equipment. A front end loader is pretty standard equipment on any farm today, and the present apparatus produces bales which can be handled by a front end loader.

Pursuant to the last stated object, the dimensions of the baler are such that it produces a bale about 3 feet in diameter by 4 feet long which contains from 350 to 450 pounds of fodder. This is in contrast to other recently developed rotary balers which produce a bale 6 or 7 feet in diameter and about 6 feet long.

THE DRAWINGS

FIG. 1 is a perspective view of a baler embodying the invention, with parts broken away for clarity;

FIG. 2 is a somewhat schematic, longitudinal sectional view taken substantially as indicated along the line 2—2 of FIG. 3;

FIG. 3 is a rear elevational view of the apparatus with parts broken away for clarity and cross bar 27 omitted;

FIG. 4 is a fragmentary sectional view on an enlarged scale taken substantially as indicated along the line 4—4 of FIG. 3;

FIG. 5 is a fragmentary sectional view taken substantially as indicated along the line 5—5 of FIG. 3;

FIG. 6 is a view like FIG. 5 showing the apparatus shifted for the first stage of a bale release operation;

DETAILED DESCRIPTION OF THE INVENTION

Figure 7:
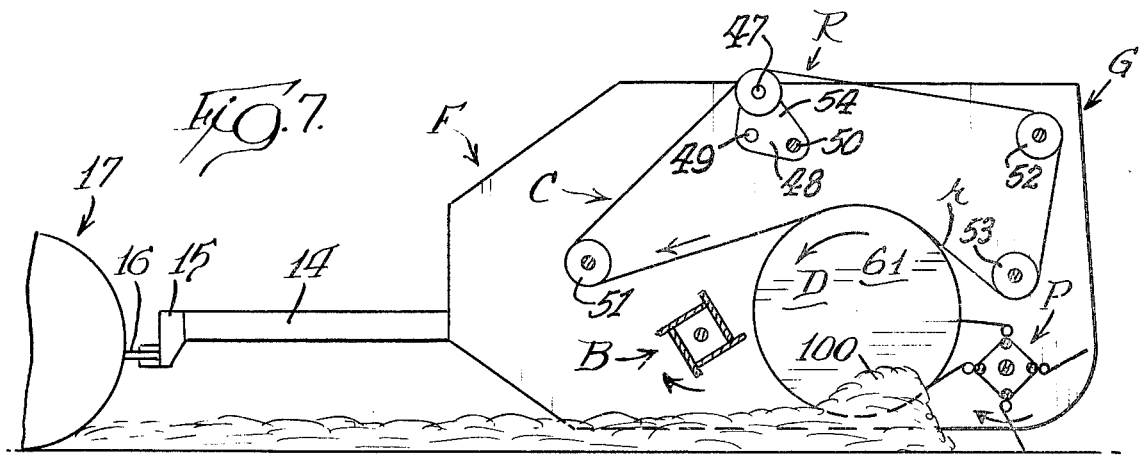
FIG. 7 is a schematic longitudinal sectional view illustrating the apparatus at the beginning of a bale rolling operation.

Referring to the drawings in greater detail, and referring first to FIGS. 1 to 3, the apparatus of the invention consists generally of a frame, indicated generally at F, the rear part of which consists of a pivoted gate, indicated generally at G, and which is provided with a pair of supporting wheel assemblies indicated generally at W; fodder pickup means, indicated generally at P; bale density control means, indicated generally at C, which includes a bale compacting raddle chain mechanism, indicated generally at R, raddle support disks indicated generally at D, and beater means, indicated generally at B. A power train, indicated generally at T, provides the drive for the pickup means P and the bale density control means C; and the apparatus also includes a combined height adjusting and bale release mechanism A.

Figure 8:
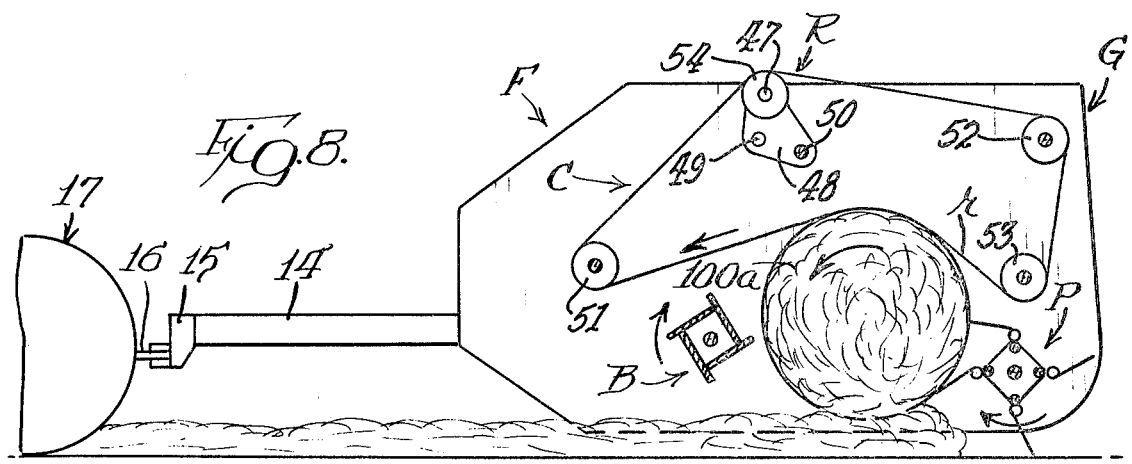
FIG. 8 is a view like FIG. 7 with a forming bale just ready to be compressed by the bale compacting means.
Figure 9:
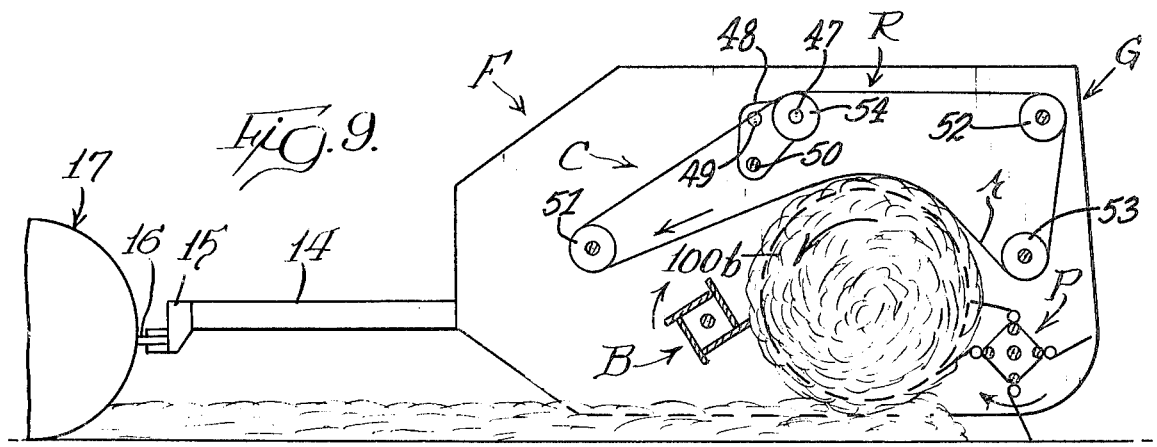
FIG. 9 is a view similar to FIGS. 7 and 8 showing a substantially completed bale about ready for release from the baling chamber.

The frame F consists of a transverse front beam 10 and side beams 11 which are surmounted by side walls 12; and an upper cross beam 13 connects the sides 12. Extending forwardly from the transverse front beam 10 is a draft tongue 14 which has a coupler 15 which is seen in FIGS. 7 to 9 adapted for attachment to the draft connection 16 of a farm tractor 17, as by a pintle (not shown). Beneath the frame side beams 11 are undercarriages, indicated generally at 18, which include upright side plates 19, external horizontal flanges 20, inclined forward flanges 21, and upright structural members 22.

The gate G consists of a pair of side plates 23 which have upright body panels 24 and integral, forwardly extending upper support arms 25 which are pivotally connected to the frame side walls 12 by pivots 26. A gate cross bar 27 connects the upper ends of the gate side plates 23; and as seen in FIG. 2 the gate side plates are also connected by an angle member 28 and a cross bar 29.

The supporting wheel means W on each side of the frame F consists of an arm 30 which is pivotally mounted at 31 on the under frame 18 and has stub axles 32 (FIGS. 5 and 6) for wheels 33.

The position of the wheel arms 30 with respect to the frame F may be varied by setting the combined adjusting and bale release mechanism A, as hereinafter described; and operation of said mechanism A moves the wheel arms 30 from the running position of FIG. 5 to the bale release position of FIG. 6 as will be described hereinafter.

As best seen in FIGS. 2 to 4, the fodder pickup means P consists of a pickup shaft 34 which is journalled in the lower portions of the gate side plates 23 and has a pair of square mounting plates 35 fixed adjacent its ends. As best seen in FIG. 4, pickup tine rock shafts 36 are journalled in the four corners of the square mounting plates 35 and carry the fodder pickup tines 37. The fodder engaging pickup tines 37 are best seen in FIGS. 3 and 4 to be arranged in several laterally spaced sets, each of which sets consists of a plurality of tines which have tips 37a that follow a closed path cp (FIG. 4) the bottom of which sweeps the ground as the pickup shaft 34 rotates.

At the righthand end of each of the rock shafts 36, as seen in FIG. 3, is a cam arm 38 provided with a cam follower roller 39 which rides in a circular cam track 40 which is carried in an inwardly open box frame 41 on the righthand gate side plate 23. The cam track 40 is eccentric with respect to the pickup shaft 34 on an axis of eccentricity which causes the fodder engaging tines 37 to accelerate as they pass through the lower portion of the closed path cp, and which retards the tines 37 in the forward part of the closed path so that the tines tend to be withdrawn endwise from the fodder as they roll it.

The angle member 28 and the rod 29 which extend between the gate side plates 23 support a fixed fodder stripping member, indicated generally at 42; and the stripping member consists of a series of U-shaped plates 43, each of which is seen in FIG. 3 to substantially fill the space between two adjacent sets of tines 37. The clearance between each of the tines 37 and the flanking fodder stripping plates 43 is no more than about ¼ inch, so the stripping member 42 effectively prevents fodder from being wound around the rock shafts 36 or from being carried by the tines 37 completely around the closed path where it could drop behind the apparatus.

The bale compressing raddle assembly R of the bale density control mechanism C is seen to comprise a front shaft 44 which is journalled in the sidewalls 12; a rear upper shaft 45 and a rear lower shaft 46, each of which is journalled in the gate side plates 23; a pair of axially aligned stub shafts 47 which are carried in bell cranks 48 that are carried upon pivot shafts 49 in the side walls 12 and connected by a cross member 50; pairs of sprockets 51 on the front shaft 44; pairs of sprockets 52 on the upper rear shaft 45; pairs of sprockets 53 on the rear lower shaft 46; pairs of sprockets 54 on the stub shafts 47; chains 55 trained over the sets of sprockets 51, 52, 53 and 54; and raddles 56 mounted upon the chains 55. The chains constitute effectively inextensible parallel endless bands, and they move in a path established by the location of the sprockets which includes a working run r the rear of which, at the sprockets 53, is substantially tangent to the tips 37a of the tines 37. The front of the path r, established by the sprockets 51, is well toward the front of the apparatus.

As seen in FIGS. 1 and 3, the mounting pivots 49 for the bell cranks 48 extend through the side walls 12 and have crank arms 57 mounted at their outer ends. An assembly including a pair of tension springs 58 is connected at 59 to each crank arm 57 and is anchored at 60 to the extreme rearward portion of each side wall 12. Thus, the springs 58 tend to rotate the bell cranks 48 counterclockwise as seen in FIGS. 1, 2, 7, 8 and 9 and thus tension the chains 55.

The disks D of the bale density control mechanism C consist of a pair of metal plates 61 which are journalled on the side walls 12 on a common axis 62 (FIG. 2), and as best seen in FIGS. 1 and 3, the lateral extremities of the raddles 56 are supported upon the disks 61 in the working run r so that, as seen in FIGS. 8 and 9, the raddles 56 bear upon a forming bale 100 to compress the fodder in it only when the forming bale exceeds the size shown as 100a in FIG. 8. From that point on, the compression means provided by the chains 55, the raddles 56, and the springs 58 acting through the bell cranks 48, places a very heavy compression upon the bale through the stage shown as 100b in FIG. 9, at which point the bale is substantially full size. As the chains 55 and raddles 56 are forced outwardly by the force of the enlarging bale 100a-100b, the springs 58 permit the bell cranks 48 to rotate clockwise, as seen in FIGS. 7 to 9, about their mounting pivots 49. This permits the working run r to arch upwardly from the position of FIG. 8 to the position of FIG. 9.

For more detailed information regarding the mounting of the disks 61 on their common axis 62, reference is made to the co-pending application of Kampman, Ulrich and Hodgson, Ser. No. 719,064, filed Aug. 30, 1976, now U.S. Pat. No. 4,103,475.

The beater means B of the bale density control mechanism C consists of a beater shaft 63 which is journalled in the side members 11 of the frame F, and a box-like beater roller 64 which is fixed to the shaft 63. As best seen in FIG. 2, the beater roller 64 is square in cross section with its four sides 65 arranged to provide projecting flanges 66. The periphery of the beater roller 64 is immediately forward of the disks 61 so that, as seen in FIG. 9, when a bale is in the final stages of its formation the beater flanges 66 tend to beat any fodder which may be loosened by the raddles 56 back into the forming bale 100b, and thus assist in compacting the bale.

As best seen in FIGS. 1 to 3, the power train T includes a gear box 67 which is mounted upon the frame cross beam 10 and has an input shaft 68 which is adapted to be driven from a power takeoff (not shown) of the tractor 17 in the usual manner. The gear box 67 also has an output shaft 69 which extends laterally through the righthand side wall 12 of the frame F where it carries a sprocket 70 outside the side wall. A drive chain 71 is trained around the sprocket 70 and around the sprocket 72 which is on a laterally projecting end portion of the front shaft 44 which carries the sprockets 51 for the chains 55. As seen in FIG. 2, another sprocket 73 is mounted upon the shaft 44 alongside the sprocket 72, and a drive chain 74 is trained around the sprocket 73 and around the sprocket 75 on a laterally projecting end portion of the beater roller shaft 63, so that the beater means B is driven along with the chains 55.

Referring now to FIG. 3, at the lefthand side of the lower rear shaft 46 immediately inside the left frame side wall 12 is a sprocket 76, and a chain 77 trained around the sprocket 76 also wraps around a sprocket 78 on the pickup shaft 34 so the pickup means P is also driven conjointly with the chains 55. All of the shafts rotate clockwise as seen in the drawings, so that the pickup tines 37 swing forwardly through the lower part of the closed path cp, the chains 55 and raddles 56 move forwardly through the working run r, and the beater roller flanges 66 are moving downwardly—i.e., in the same direction as the surface of the forming bale 100b—in their area of contact.

The input speed at the gear box 67 is 540 rpm; and the gearing in the power train T is selected to give the raddles 55 a linear rate of travel of 256 feet (about 78 meters) per minute. This is approximately 95% of the three mile (4.83 km) per hour ground speed of a tractor which is normal for a baling operation.

The drive for the beater means B is from a 30 tooth sprocket 73 to a 21 tooth sprocket 75; and with a beater roll dimension of 3.5 inches from the center of the beater shaft 63 to the tips of the beater flanges 66 this provides a peripheral speed of 350 feet (about 106 meters) per minute for the beater roller.

The drive for the pickup P is from a 36 tooth sprocket 76 to a 25 tooth sprocket 78; and with a distance from the pickup shaft center 34 to the tine tips 37a of about 11 inches at the bottom of the closed path cp, this produces a tine tip speed of about 535 feet (162.3 m) per minute without taking into account the acceleration of the tines through that portion of their closed path cp due to the action of the cam follower arms 38 upon the rock shafts 36.

Thus, the raddle speed is somewhat less than 50% of the pickup tine tip speed; and the firming roller surface speed is about ⅔ of the pickup tine tip speed and a little more than 1⅓ times raddle speed.

Turning now particularly to FIGS. 1, 5 and 6, the combined height adjustment and bale release mechanism A is seen to include a pair of levers, such as the lever 79 in FIG. 1, which are pivoted upon the frame side walls 12 at 80 and extend rearwardly alongside the gate side plates 23. Laterally extending, depending brackets 81 at the tops of the gate side plates 23 provide upper connections 82 for a pair of turn buckles 83 which have their lower ends pivotally connected to the rear ends of the levers 79 at 84.

Gate operating hydraulic cylinder units 85 have their piston rods connected to intermediate pivots 86 on the levers 79, and have their lower ends pivoted at 87 on brackets 88 on the rear of the wheel mounting arms 30.

On the inner surfaces of the wheel mounting arms 30 are upright latch plates 89 which cooperate with outwardly extending latch studs 90 upon the gate side plates 23, so that when the wheel mounting arms 30 are in the normal position of FIG. 5 the latch plates 89 and studs 90 prevent rearward movement of the gate G.

Stop means, indicated generally at 91, restricts movement of the wheel mounting arms 30 about their pivots 31, and consists of a pair of bifurcated brackets 92 which are pivotally mounted at 93 upon the underframe 18. Stop pins 94 extend between the arms of the bifurcated brackets 92; and the inner faces of the wheel mounting arms 30 are provided with inwardly projecting stop pins 95 which extend between the arms of the bifurcated brackets 92 to cooperate with the bracket pins 94 in limiting pivotal movement of the wheel mounting arms 30. The bracket pins 94 are vertically adjustable.

It is apparent that adjustment of the length of the turnbuckles 83 rotates the levers 79 about their pivots 80, and thus adjusts the position of the rear end of the frame F with referenceto the wheels 33. This, in turn, produces adjustment of the tine tips 37a relative to the ground. The adjustment afforded by the turnbuckles 83 necessitates the vertical adjustability of the bracket stop pins 94 in the bifurcated brackets 92.

In the course of a bale rolling operation, the tractor 17, towing the baling apparatus, is driven along with both the tractor wheels and the baler wheels 33 spanning the swath, and with the tractor pto engaged to drive the pickup means P and the bale compression control means C. The forward movement of the baling apparatus, combined with the rotary movement of the pickup means P, rolls the fodder in the swath into a bale generally as seen in FIGS. 7 to 9; and the forming bale is under no compression from the raddles 56 until the size of the bale is greater than the diameter of the disks 61. Compression of the outer portion of the bale then commences, with the outer periphery of the bale being continuously compressed by the raddles and beaten by the beater roller flanges so that the outer part of the bale becomes quite dense. The finished size of the bale is such that its upper surface projects only about an inch above the tops of the disks 61 at the time the bale is ready to be released from the machine.

When the tractor operator sees that the bale is a proper size, he operates a valve in the tractor hydraulic system to admit hydraulic fluid under pressure to the hydraulic cylinder units 85 and extend their piston rods. This initially acts to pivot the wheel mounting arms 30 about their pivots 31 from the position of FIG. 5 to the position of FIG. 6, releasing the gate latch pins 90 from the latch members 89 on the wheel mounting arms. After the wheel mounting arms 30 reach their limit positions shown in FIG. 6, continuing extension of the piston rods acts through the levers 79 and the turnbuckles 83, acting as links, to swing the gate G upwardly about its pivots 26. This carries the pickup means P and the rearward part of the chains 56, carried upon the sprockets 52 and 53, upwardly so that continuing forward movement of the baling apparatus leaves the bale behind.

In practice, the operator first stops the tractor and baler while continuing to operate the pto to separate the bale from the unbaled swath, and then stops the pto before opening the gate G and moving the baling apparatus forward to release the bale. When the rear of the baling apparatus is sufficiently forward of the bale, the hydraulic valve is reversed, and the weight of the gate G plus the weight of the frame F acts to expel the hydraulic fluid from the cylinder of the cylinder and piston unit 85, so that the gate first closes of its own weight and the wheel mounting arms 30 then return to the position of FIG. 5. The tractor and baling apparatus can then be backed far enough to place the pickup P above the end of the swath adjacent the finished bale, and the pto is again engaged to start a new bale as the tractor is moved forward.

The foregoing detailed description is given for clearness of understanding only and no unnecessary limitations should be understood therefrom as modifications will be obvious to those skilled in the art.

We claim:

1. In a bale forming apparatus which has a frame adapted to span a swath of fodder, means on said frame for operatively connecting it to the rear of a farm tractor for movement along a swath lying on the ground, means in the frame for contacting the swath on the ground and rolling it into a spiral bale as the apparatus advances along the swath, and means for elevating a rearward portion of the apparatus to release a finished bale from the rear of the apparatus, improved swath contacting and rolling means comprising, in combination:

a transverse fodder pickup shaft journalled at the lower rear portion of the frame;

several laterally spaced sets of fodder engaging tines carried by said fodder pickup shaft, each of said sets consisting of a plurality of tines which have tips that follow a closed path the bottom of which sweeps the ground as the fodder pickup shaft rotates;

means for driving the fodder pickup shaft so the tine tips move forwardly through the bottom of said closed path to roll the fodder forwardly as the apparatus advances along the swath;

a fixed fodder stripping member mounted on the frame and comprising plates between adjacent tine sets forward of the pickup shaft;

a pair of longitudinally extending effectively inextensible parallel endless bands and transverse bale compressing raddles mounted thereon;

a plurality of pairs of rotatable band supports carried on the frame on which said bands are supported to move in a path which includes a lower working run the rear of which is above and effectively tangent to the path of the tine tips, and the front of which is near the front of the apparatus;

a pair of disks journalled on the sides of the frame on a common axis, said disks being slightly smaller than the diameter of a finished bale and supporting the ends of the raddles so the working run arches upwardly between the rear and the front;

means for tensioning said bands so that when a forming bale is larger than the disks the raddles heavily compress the fodder in the periphery of the bale;

means on the frame mounting one pair of the rotatable band supports for movement permitting the working run of the bands to be lifted off the disks by the force of the forming bale;

and means for driving the endless bands to move forwardly in the working run.

2. The combination of claim 1 which includes a transverse beater means journalled in the frame immediately forward of the disks, and means for driving said beater means in the same direction as the pickup shaft.

3. The combination of claim 2 in which the beater means has projecting flanges which tend to beat fodder loosened by the raddles back into the forming bale.

4. The combination of claim 3 in which the beater means comprises a roller.

5. The combination of claim 4 in which the beater roller is substantially square in cross section and each flange is a straight extension of a side of the square.

6. The combination of claim 1 in which the plates of the fodder stripping member substantially fill the spaces between the adjacent tine sets.

7. The combination of claim 6 in which the plates of the fodder stripping member are U-shaped and have bights below the pickup shaft.

8. The combination of claim 1 in which the pickup shaft is provided with fixed support plates, rock shafts are journalled in said plates parallel to the pickup shaft, the tines are mounted on the rock shafts, a cam track is on the frame eccentric to the pickup shaft, and cam followers on the rock shafts ride in said track to cause oscillation of the rock shafts as the pickup shaft rotates, said oscillation projecting and accelerating the tines as they sweep the ground and retarding and retracting the tines in the forward part of their path.

9. In a bale forming apparatus which has a frame adapted to span a swath of fodder, means on said frame for operatively connecting it to the rear of a farm tractor for movement along a swath lying on the ground, means in the frame for contacting the swath on the ground and rolling it into a spiral bale as the apparatus advances along the swath, and means for elevating a rearward portion of the apparatus to release a finished bale from the rear of the apparatus, improved swath contacting and rolling means comprising, in combination:

a transverse fodder pickup shaft journalled at the lower rear portion of the frame;

several laterally spaced sets of fodder engaging tines carried by said fodder pickup shaft, each of said sets consisting of a plurality of tines which have tips that follow a closed path the bottom of which sweeps the ground as the fodder pickup shaft rotates;

means for driving the fodder pickup shaft so the tine tips move forwardly through the bottom of said closed path at a predetermined tip speed to roll the fodder forwardly as the apparatus advances along the swath;

a fixed fodder stripping member mounted on the frame and comprising plates between adjacent tine sets forward of the pickup shaft;

a pair of longitudinally extending effectively inextensible parallel endless bands and a transverse bale compressing raddles mounted thereon;

a plurality of pairs of rotatable band supports on which said bands are supported to move in a path which includes a lower working run the rear of which is positioned to receive fodder from the tine tips and the front of which is near the front of the apparatus;

a pair of disks journalled on the sides of the frame on a common axis, said disks being slightly smaller than the diameter of a finished bale and supporting the ends of the raddles so the working run arches upwardly between the rear and the front;

means for tensioning said bands so that when a forming bale is larger than the disks the raddles heavily compress the fodder in the periphery of the bale;

means on the frame mounting one pair of the rotatable band supports for movement permitting the working run of the bands to be lifted off the disks by the force of the forming bale;

and means for driving the endless bands to move forwardly in the working run at a speed which is substantially less than the tine tip speed.

10. The combination of claim 9 which includes a transverse beater means journalled in the frame immediately forward of the disks, and means for driving said beater means in the same direction as the pickup shaft and at a speed greater than the speed of the endless banks.

11. The combination of claim 10 in which the predetermined tip speed of the tines is of the order of twice the speed of the endless bands and of the order of 50% greater than the speed of the beater means.

12. The combination of claim 9 in which the predetermined tip speed of the tines is of the order of twice the speed of the endless bands.

13. In a bale forming apparatus which has a frame adapted to span a swath of fodder, means on said frame for operatively connecting it to the rear of a farm tractor for movement along a swath lying on the ground, means in the frame for contacting the swath on the ground and rolling it into a spiral bale as the apparatus advances along the swath, and means for elevating a rearward portion of the apparatus to release a finished bale from the rear of the apparatus, improved swath contacting and rolling means comprising, in combination:

a transverse fodder pickup shaft journalled at the lower rear portion of the frame;

several laterally spaced sets of fodder engaging tines carried by said fodder pickup shaft, each of said sets consisting of a plurality of tines which have tips that follow a closed path the bottom of which sweeps the ground as the fodder pickup shaft rotates;

means for driving the fodder pickup shaft so the tine tips move forwardly through the bottom of said closed path to roll the fodder forwardly as the apparatus advances along the swath;

a pair of longitudinally extending effectively inextensible parallel endless bands and transverse bale compressing raddles mounted thereon;

a plurality of pairs of rotatable band supports carried on the frame on which said bands are supported to move in a path which includes a lower working run the rear of which is positioned to receive fodder from the tines, and the front of which is near the front of the apparatus;

a pair of disks journalled on the sides of the frame on a common axis, said disks being slightly smaller than the diameter of a finished bale and supporting the ends of the raddles so the working run arches upwardly between the rear and the front;

means for tensioning said bands so that when a forming bale is larger than the disks the raddles heavily compress the fodder in the periphery of the bale;

means on the frame mounting one pair of the rotatable band supports for movement permitting the working run of the bands to be lifted off the disks by the force of the forming bale;

means for driving the endless bands to move forwardly in the working run;

transverse beater means journalled directly in the frame immediately forward of the disks;

and means for driving said beater means in the same direction as the pickup shaft.

14. The combination of claim 13 in which the beater means is a roller having projecting flanges which tend to beat fodder loosened by the raddles back into the forming bale.

15. The combination of claim 13 which includes a fixed fodder stripping member mounted on the frame to strip fodder from the tines.

16. The combination of claim 14 in which the beater roller is substantially square in cross section and each flange is a straight extension of a side of the square.

* * * * *